(12) United States Patent
Kumar et al.

(10) Patent No.: US 7,978,669 B2
(45) Date of Patent: Jul. 12, 2011

(54) METHODS AND APPARATUS FOR EFFICIENT MPEG TRANSMISSION OVER 802.11

(75) Inventors: Rajneesh Kumar, San Jose, CA (US); Aseem Asthana, San Jose, CA (US); Sravan Vadlakonda, Sunnyvale, CA (US); Ashish Chotai, Santa, CA (US)

(73) Assignee: Cisco Technology, Inc., San Jose, CA (US)

( * ) Notice: Subject to any disclaimer, the term of this patent is extended or adjusted under 35 U.S.C. 154(b) by 1040 days.

(21) Appl. No.: 11/746,638

(22) Filed: May 9, 2007

(65) Prior Publication Data

US 2008/0279159 A1  Nov. 13, 2008

(51) Int. Cl.
*H04Q 7/24* (2006.01)

(52) U.S. Cl. .................. 370/338; 370/473; 370/252

(58) Field of Classification Search .................. None
See application file for complete search history.

(56) References Cited

U.S. PATENT DOCUMENTS

| | | |
|---|---|---|
| 6,667,698 B2 | 12/2003 | Apostolopoulos et al. |
| 6,940,903 B2 | 9/2005 | Zhao |
| 7,136,356 B2 | 11/2006 | Suzuki et al. |
| 2005/0169174 A1 | 8/2005 | Apostolopoulos et al. |
| 2005/0169175 A1 | 8/2005 | Apostolopoulos |
| 2005/0169312 A1* | 8/2005 | Cakareski et al. ............ 370/473 |
| 2008/0063362 A1* | 3/2008 | Grigorian .................... 386/84 |
| 2008/0225735 A1* | 9/2008 | Qiu et al. ..................... 370/252 |

* cited by examiner

*Primary Examiner* — Phuoc Doan
(74) *Attorney, Agent, or Firm* — P. Su (57) ABSTRACT

In one embodiment, a method includes characterizing a first packet of a video stream as being associated with a first frame type, wherein the video stream is arranged to be transmitted on a wireless local area network. The method also includes processing at least the first packet of the video stream as being associated with the first frame type if the first packet of the video stream is characterized as being of the first frame type.

14 Claims, 9 Drawing Sheets

METHODS AND APPARATUS FOR EFFICIENT MPEG TRANSMISSION OVER 802.11

BACKGROUND OF THE INVENTION

The transmission of video data over a wireless fidelity (WiFi) network such as an 802.11 network is becoming more prevalent. As such, the efficient transmission of video data, e.g., data encoded in an MPEG transmission format or MPEG video streams, is essential to ensure that the video data is timely received at an intended destination. The timeliness within which MPEG streams are received is crucial to ensure that the MPEG streams may be presented or otherwise displayed with a relatively high degree of accuracy.

As will be appreciated by those skilled in the art, an MPEG stream typically includes I-frames and P-frames. An I-frame is arranged to store substantially all data that is needed to display a frame, and a P-frame is arranged to be sent after an I-frame, and to include substantially only data updates to the data associated with the preceding I-frame. Hence, an I-frame is generally larger than a P-frame. Further, the efficient transmission of an I-frame to a destination is crucial in ensuring a satisfying viewing experience of a displayed frame, whereas the efficient transmission of a P-frame is less crucial.

BRIEF DESCRIPTION OF THE DRAWINGS

The invention may best be understood by reference to the following description taken in conjunction with the accompanying drawings in which.

DESCRIPTION OF THE EXAMPLE EMBODIMENTS

General Overview

In one embodiment, a method includes characterizing a first packet of a video stream as being associated with a first frame type, wherein the video stream is arranged to be transmitted on a wireless local area network. The method also includes processing at least the first packet of the video stream as being associated with the first frame type if the first packet of the video stream is characterized as being of the first frame type.

Description

Properties of MPEG encoding techniques may be used to generate heuristics that are utilized by a network element, e.g., a controller or an access point, to intelligently process I-frames and P-frames included in a video stream that is transmitted over a wireless fidelity (WiFi) network or an 802.11 network. These frames may be fragmented into multiple packets. By allowing I-frames and P-frames to be identified, a network element included in an 802.11 network may handle packets making I-frames and P-frames differently in such a way as to ensure that the I-frames and the P-frames are handled with appropriate priorities. For example, a client or a station that receives a frame over an 802.11 network from an access point may provide feedback to the access point to indicate whether the frame the station is receiving is an I-frame or a P-frame. The feedback provided may also effectively contain the number of packets constituting an I-frame, by looking at the first packet. By way of example, the feedback message may include the number of packets, or the feedback message may include information that allows the number of packets constituting an I-frame to be determined. The feedback may also provide the access point with information pertaining to the average size of packets containing a P-frame. Using the feedback provided by the station, the access point may anticipate whether the next packets it receives for forwarding to the station are likely to contain fragments of I-frame or P-frame and, hence, handle those packets appropriately. The ability to anticipate whether packets contain fragments of I-frames or P-frames allows an access point to transmit the packets constituting a frame in a manner that is likely to provide a highly satisfactory viewing experience, particularly in the event that channel-load conditions associated with the access point are relatively high.

Figure 1A:
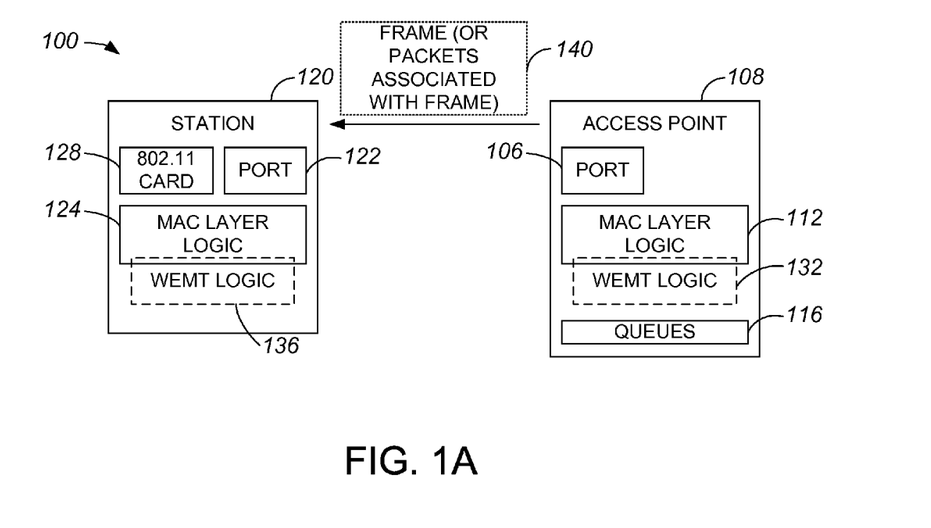
FIG. 1A is a block diagram representation of an MPEG frame being transmitted to a station by an access point in accordance with an embodiment of the present invention.

In one embodiment, the ability to provide for the efficient transmission of MPEG or video streams over 802.11 is achieved using wireless local area network (WLAN) efficient MPEG transmission (WEMT) logic. The WEMT logic is generally arranged to determine whether packets that are being transmitted contain fragments of I-frames or P-frames, and to process the packets accordingly to increase the likelihood that the I-frames are transmitted more efficiently and reliably. FIG. 1A is a block diagram representation of an MPEG frame being transmitted to a station by a controller such as an access point in accordance with an embodiment of the present invention. Within a network 100 such as a WiFi or 802.11 network, a station 120 may communicate with other stations (not shown) via an access point 108. Access point 108 includes a port or input/output interface 106 that allows access point 108 to receive and to transmit information. Access point 108 includes media access control (MAC) layer logic 112 which cooperates with WEMT logic 132 to cause packets forming I-frames to be transmitted using different parameters, as for example a higher packet aging time out, than packets which correspond to a P-frame. By using a higher packet aging time out for packets that are associated with I-frames than used for packets containing P-frames, WEMT logic 132 effectively allows more opportunity for I-frames to be provided to station 120. In general, WEMT logic 132 affects the functionality of MAC layer logic 112.

As will be appreciated by those skilled in the art, access point 108 may also include queues 116 into which frames are queued for transmission. Queues 116 are arranged to effectively hold video streams for transmission on a MAC layer to stations such as station 120. Typically, a single queue included in queues 116 may be arranged to hold and to transmit video packets.

Station 120 is arranged to receive a frame or a fragment 140 transmitted by access point 108, e.g., in the course of a video conference. Typically, frame 140 may be received on a port or input/output interface 122. Station 120, which may be a wireless device such as a phone or a computing system, includes an 802.11 card 128. Station 120 also includes MAC layer logic 124 and WEMT logic 136. MAC layer logic 124 and WEMT logic 136 are arranged to cooperate to analyze frame 140 or, more specifically, packets that comprise frame 140 such as fragments of frame 140, and to determine whether frame 140 is associated with an I-frame or with a P-frame.

Figure 1B:
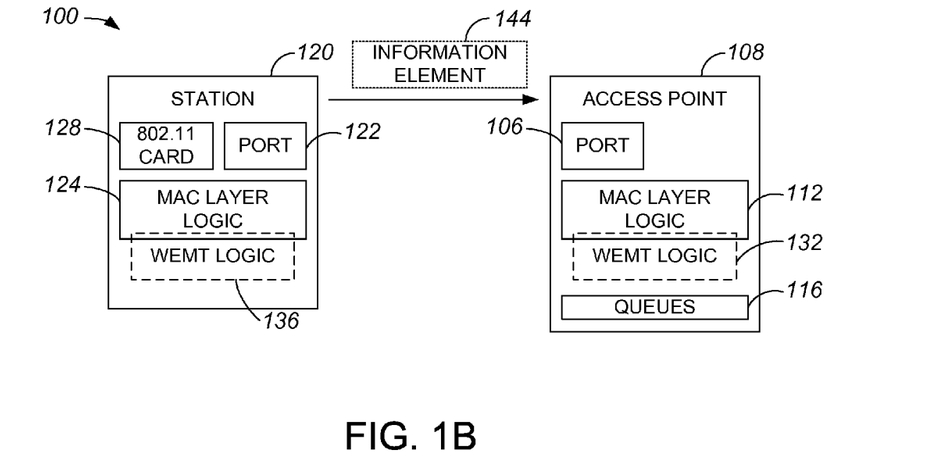
FIG. 1B is a block diagram representation of an information element being transmitted from a station to an access point, e.g., from station 120 to access point 104 of FIG. 1A, after receiving and assessing a frame in accordance with an embodiment of the present invention.

WEMT logic 136 is configured to cause an information element 144 to be sent via port 122 to access point 108, as shown in FIG. 1B. Information element 144 may be a notification regarding whether frame 140 is associated with an I-frame or a P-frame. Using information contained in information element 144, access point 108 may, using WEMT logic 132, process frames or fragments of video streams held in queues 116 based on the information. For example, if information element 144 includes an indication that frame 140 is associated with an I-frame and an indication of how many frames or fragments will be included in the overall I-frame, then WEMT logic 132 may cause an appropriate number of frames or fragments to be processed as being part of an I-frame.

Figure 2:
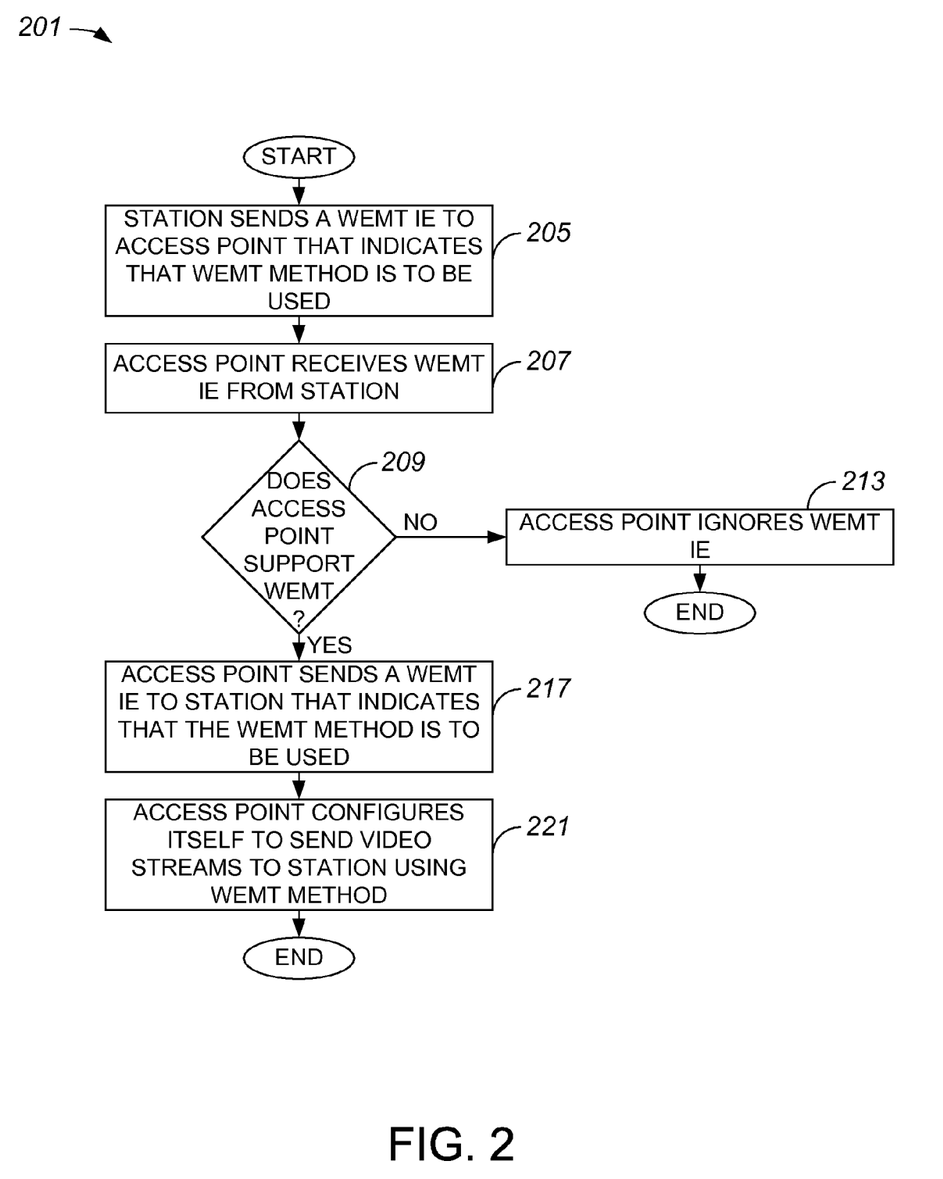
FIG. 2 is a process flow diagram which illustrates a method of initiating wireless local area network (WLAN) efficient MPEG transmission (WEMT) in a system in accordance with an embodiment of the present invention.

In order to effectively ensure that relatively good quality video is transmitted from an access point to a station, the ability to process I-frames with "priority" over P-frames may enable the packets corresponding to I-frames to be transmitted in a more timely manner than the packets corresponding to P-frames. Hence, if both an access point and a station within a WLAN support WMET, the processing of packets corresponding to I-frames may effectively be prioritized for transmission if such packets are identified in video streams. With reference to FIG. 2, one process of initiating WEMT in a system will be described in accordance with an embodiment of the present invention. Generally, a station may trigger or otherwise attempt to trigger WEMT processing when the station ascertains that channel load conditions are relatively high. A process 201 of initiating WEMT between a station, e.g., a wireless computing device, and a controller such as an access point begins at step 205 in which the station sends a WEMT information element to the access point. The WEMT information element may indicate that the station supports WEMT, and requests that a WEMT method be used to send streams, e.g., MPEG video streams, for the access point. The WEMT information element may be included in substantially any message that is sent by the station to the access point. In one embodiment, the WEMT information element may be contained in a management frame such as an add traffic stream (ADDTS) request.

In step 207, the access point receives the WEMT information element. A determination is then made in step 209 regarding whether the access point supports WEMT. Typically, such a determination may be made by the access point upon receipt of the WEMT information element, as an access point which supports WEMT will typically recognize the WEMT information element. If it is determined that the access point does not support WEMT, the access point effectively ignores the WEMT information element in step 213, and the process of initiating WEMT is terminated. Alternatively, if it is determined that the access point supports WEMT, the indication is that WEMT may be used by the access point to provide the station with video streams. Hence, in step 217, the access point sends a WEMT information element to the station that indicates that the WEMT method is to be used. In other words, the access point sends a WEMT information element that is an assent to using WEMT. The access point may send the WEMT information element as a part of a management frame such an ADDTS response.

Once the access point sends the WEMT information element to the station, the access point configures itself to send video streams to the station using the WEMT method in step 221. When the access point configures itself to use WEMT, the access point may generally configure itself to reset parameters based upon information that may be received from the station once WEMT transmission has begun. Upon configuring itself to use a WEMT method to send video streams, the process of initiating WEMT is completed.

A station may determine the size of an I-frame that is to be received from an access point by reading a header of a real-time transport protocol (RTP) packet it receives from the access point. For example, when the first fragment of a RTP packet that corresponds to an I-frame arrives at a station, the station may determine the number of internet protocol (IP) fragments that will likely follow the packet. Typically, an I-frame transported using an IP based protocol such as RTP may essentially be broken down into between approximately fifteen to approximately twenty IP fragments. In one embodiment, substantially all these fragments are transmitted as 802.11 packets. The first of these packets generally contains the RTP header and the size of the I-frame, as for example in the codec specific header. Using the RTP header and the size of the I-frame, the number of packets constituting the I-frame may be deduced. By communicating information relating to the size of an I-frame to the access point, the access point may effectively ensure that the packets constituting an I-frame are processed such that it has a higher chance of successful transmission.

Figure 3A:
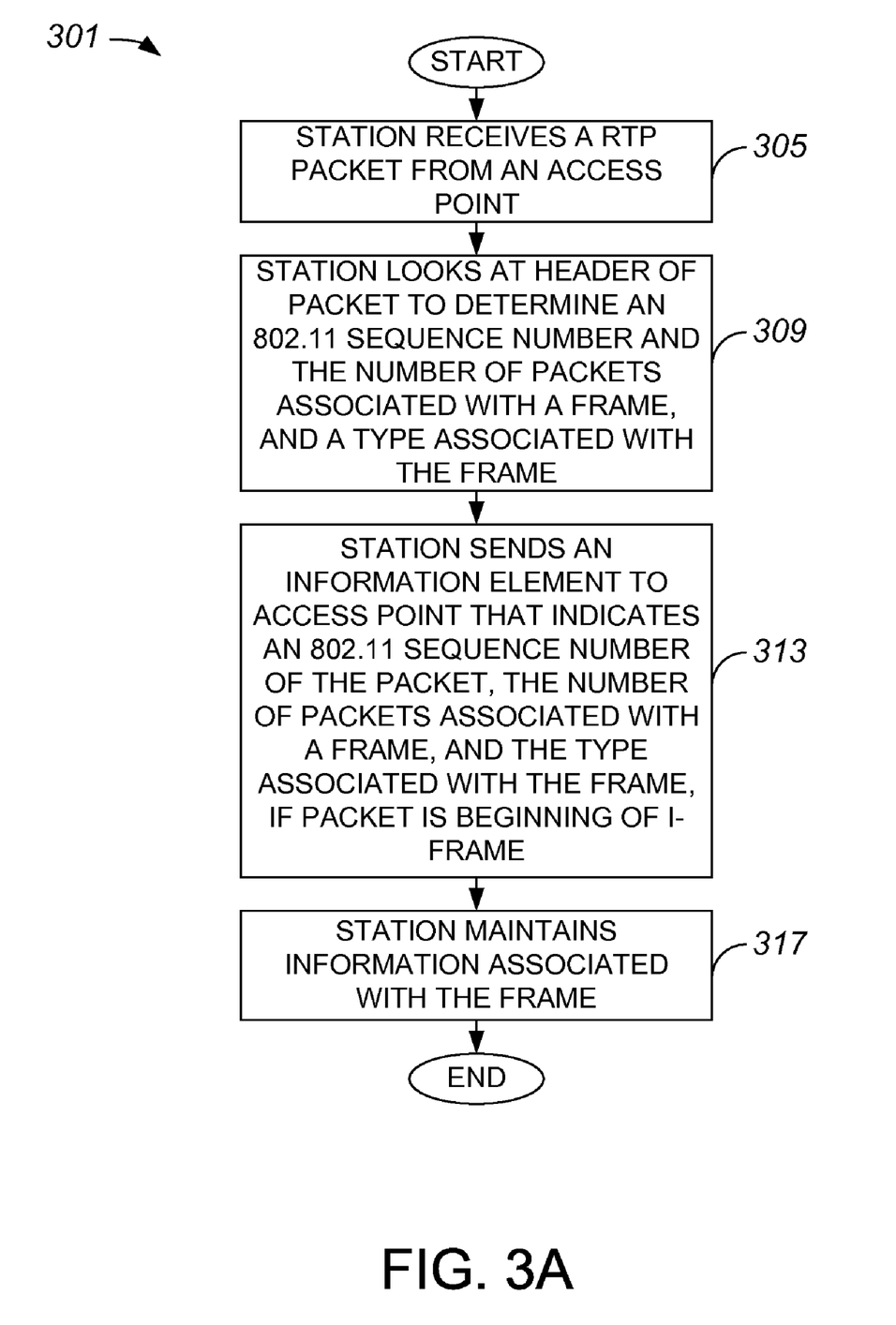
FIG. 3A is a process flow diagram which illustrates a method of notifying an access point of a number of packets associated with a frame that is likely to be received by the access point for transmission in accordance with an embodiment of the present invention.

FIG. 3A is a process flow diagram which illustrates a method of notifying an access point of a number of packets of a frame that is likely to be received by the access point for transmission in accordance with an embodiment of the present invention. A process 301 of notifying an access point regarding packets constituting a frame begins at step 305 in which the station receives a RTP packet from an access point. It should be appreciated that the RTP packet is generally a first packet that is received for a frame. Hence, process 301 does not generally occur for each packet that is received.

After the station receives the RTP packet, the station studies the header in step 309, and effectively identifies an 802.11 sequence number and a number of packets associated with a frame. The station may also identify a type associated with the frame. By way of example, the station may identify the 802.11 sequence number of the 802.11 packet and/or a number of packets that follow the packet to form a frame of a particular type such as an I-frame type.

In step 313, if the packet is the beginning of an I-frame, the station sends a WEMT information element to the access point that indicates the 802.11 sequence number of the received packet, the number of packets that are anticipated to compose a frame which includes the received packet, and the frame type. The information element may be sent in substantially any frame or packet, as for example a data packet of an ethertype wemt_ether_type that is defined within an overall system that supports WEMT. A specialized packet that is defined as an ethertype wemt_ether_type type with an iframe_fragment_throttle_subtype_packet subtype may effectively be the information element, e.g., when the type of the frame is identified as being an I-frame. It should be appreciated that the station generally only sends the WEMT information element as feedback if the frame is an I-frame.

Once the information element is sent to the access point, the station maintains information associated with the frame in step 317. The information is maintained such that the station may essentially maintain heuristic and/or diagnostic information including, but not limited to, the average size of an I-frame and the average size of a P-frame. Upon maintaining the information, the process of notifying an access point is completed.

Figure 3B:
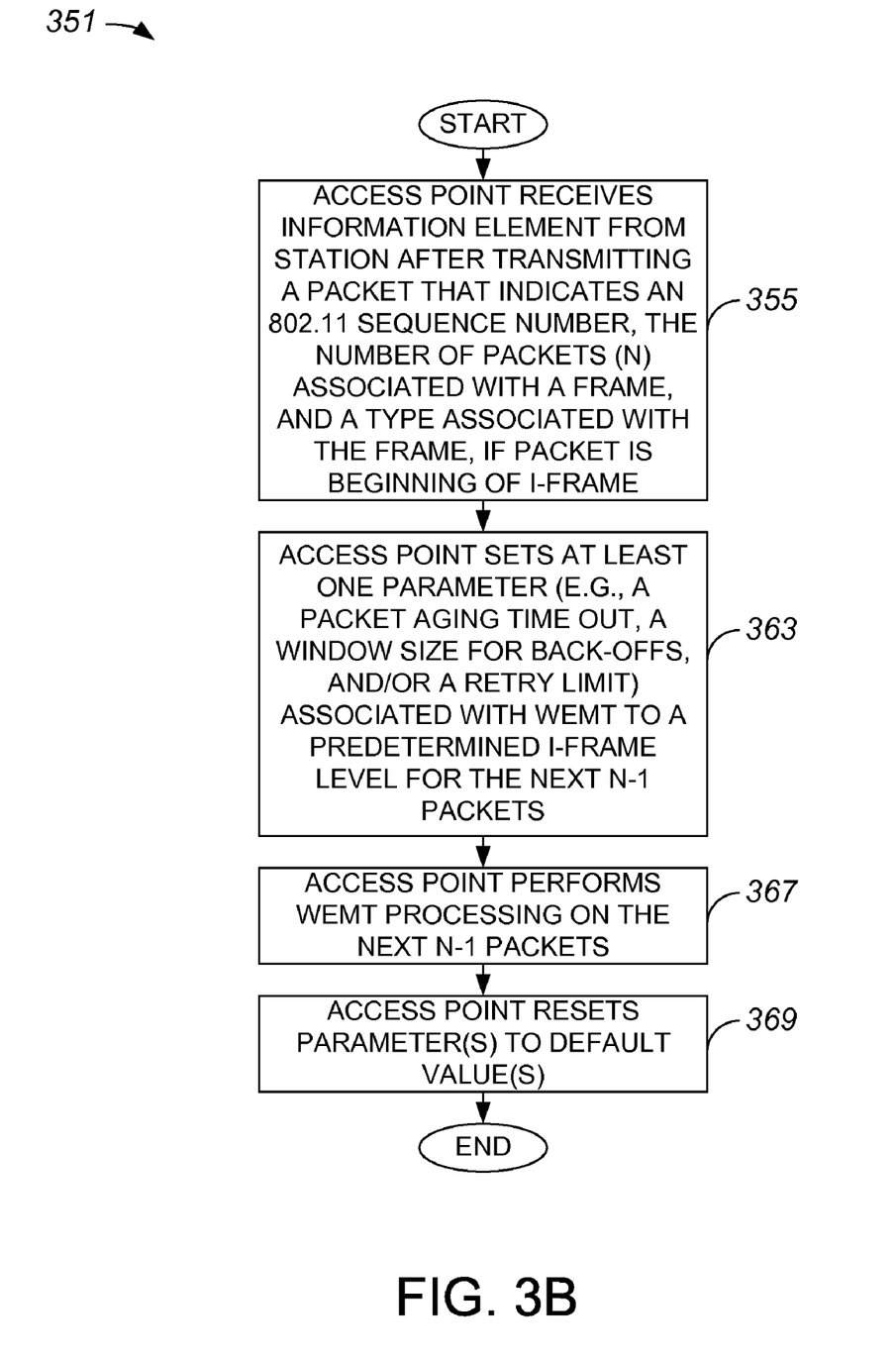
FIG. 3B is a process flow diagram illustrates a method of an access point responding to a notification of a number of packets of a frame that is likely to be received for transmission in accordance with an embodiment of the present invention.

Using the information sent by the station, the access point may configure itself to efficiently transmit frames to the station. FIG. 3B is a process flow diagram illustrates a method of an access point responding to a notification of a number of packets of a frame that is likely to be received for transmission to a station in accordance with an embodiment of the present invention. A process 351 of responding to a notification received from a station begins at step 355 in which the access point receives an information element from the station in response to an RTP packet of a video stream that was transmitted to the station, if the packet is the beginning of an I-frame. The information element may include an 802.11 sequence number, a number of packets (N) associated with a frame, and a type associated with the frame. As previously mentioned, the information element may be embodied as an ethertype wemt_ether_type packet type with an iframe-fragment-throttle-subtype packet subtype.

It should be appreciated that the substantially "default" values are used when WEMT processing is not in use. In one embodiment, the default values may be values that are appropriate for the WEMT processing of P-frames. The parameters that are set by the access point may include, but are not limited to, a processing priority, a packet aging time out, back-off parameters, and/or a transmission retry limit. Back-off parameters are basically a numerical upper limit and a numerical lower limit that are used by a transmission queue, e.g., a video transmission queue, to back off for a random time chosen between the numerical limits. Back-off parameters, therefore, determine how aggressive a queue is in accessing a medium versus backing off and deferring to other traffic on the air. For example, if the upper and lower limit are too close to each other, the back-off range may be too small on average. In addition, if the lower limit is relatively close to zero, the queue will typically be very aggressive since it will always have a small back-off.

Process flow moves from step 359 to step 363 in which the access points sets at least one parameter associated with processing video streams to a predetermined level for I-frames for at least the next N−1 packets. It should be appreciated that after at least the next N−1 packets, default parameters may then be used for processing. The predetermined level for parameters used in WEMT processing for I-frames may be arranged to ensure that the packets which comprise the I-frame are processed with a higher chance of successful transmission. As such, the processing priority may be set to a higher value than a default value, a packet aging time out may be set to a higher value than a default value, a window size for back-offs may be increased over a default value, and/or a transmission retry limit may be increased over a default value.

After the access point sets at least one parameter to a level associated with the WMET processing of an I-frame, the access point performs WEMT processing for the next N−1 packets in step 367. In one embodiment, after the next N−1 packets are processed, it should be appreciated that any parameters that were set in step 363 may be returned to their default values in step 367. Once the access point performs WEMT processing for the next N−1 packets, and resets parameters as appropriate, the process of responding to a notification is completed.

As previously mentioned, a station may store information such that heuristic and/or diagnostic information relating to received video streams may be determined. Such information may be used to compute the average size of a packet containing a P-frame. By providing the average size of a packet containing a P-frame to an access point, i.e., the access point that transmitted the video stream to the station, the access point may then effectively de-prioritize the packets that are likely to contain a P-frame.

Figure 4A:
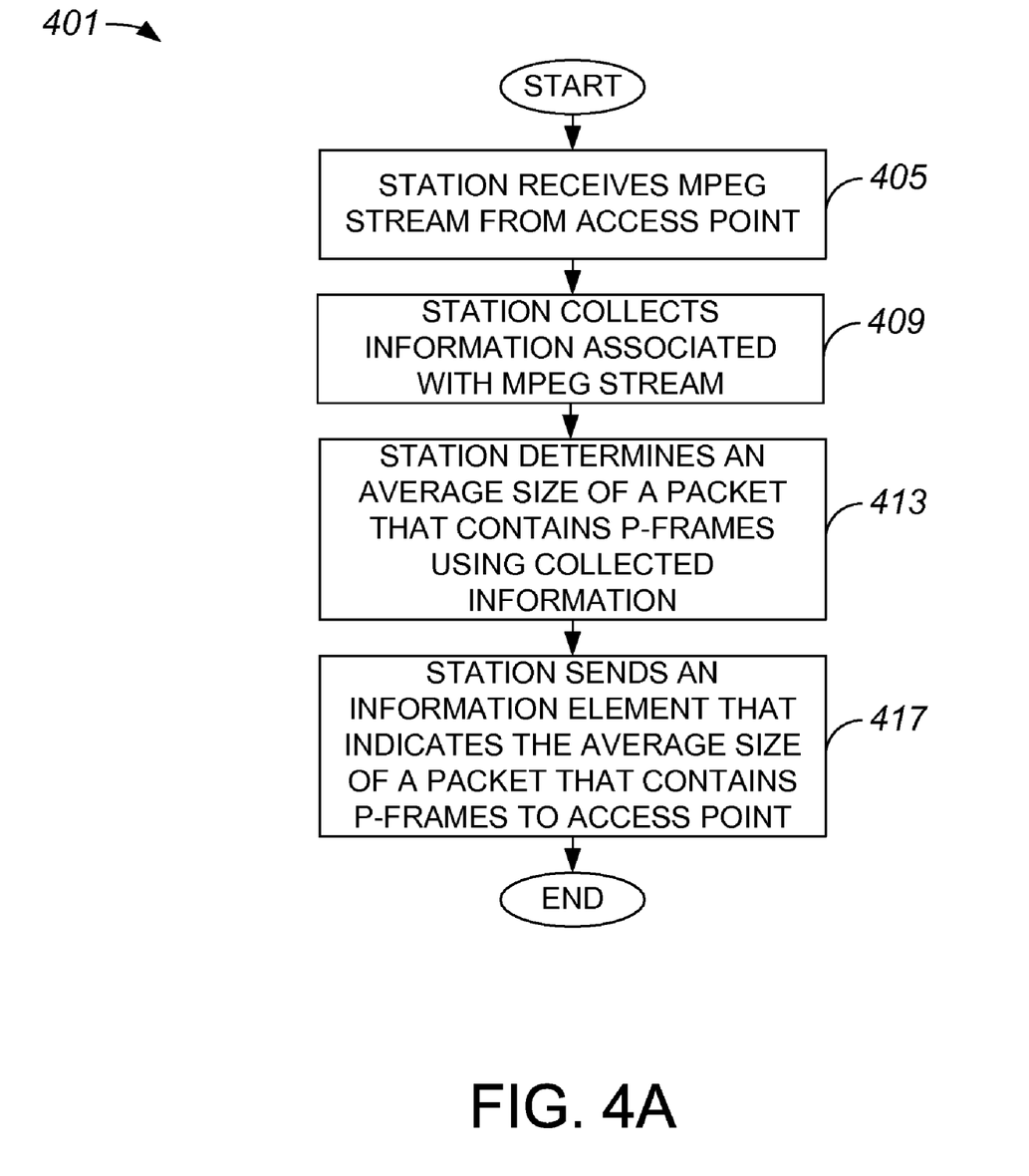
FIG. 4A is a process flow diagram which illustrates a method of notifying an access point of an average size of a packet that associated with P-frames in accordance with an embodiment of the present invention.

With reference to FIG. 4A, a process of notifying an access point of an average size of a packet that contains P-frames will be described in accordance with an embodiment of the present invention. A process 401 of notifying an access point of an average size of a packet that contains P-frames begins at step 405 in which a station receives a video stream, e.g., an MPEG stream, from an access point. The video stream may be received across an 802.11 network. After the station receives the video stream, the station collects information associated with the video stream in step 409.

The station may collect packets to identify packets that contain P-frames, and then identify a number of packets that contain P-frames that is considered to be suitable, as for example by a network administrator, to determine the average packet size of a P-frame. In step 413, the station determines an average size of a packet that contains P-frames using the information collected in step 409. Then, in step 417, the station may send a WEMT information element to the access frame. The WEMT information element may be arranged to indicate an average size of a packet that contains P-frames. While the information element may be included in substantially any message, as for example a management message, that is transmitted to an access point, the information element may instead be embodied in an ethertype wemt_ether_type data packet of an iframe_pframe_avg_size_subtype subtype. Once the station sends an information element to the access point, the process of notifying an access point of an average size of a packet is completed.

Figure 4B:
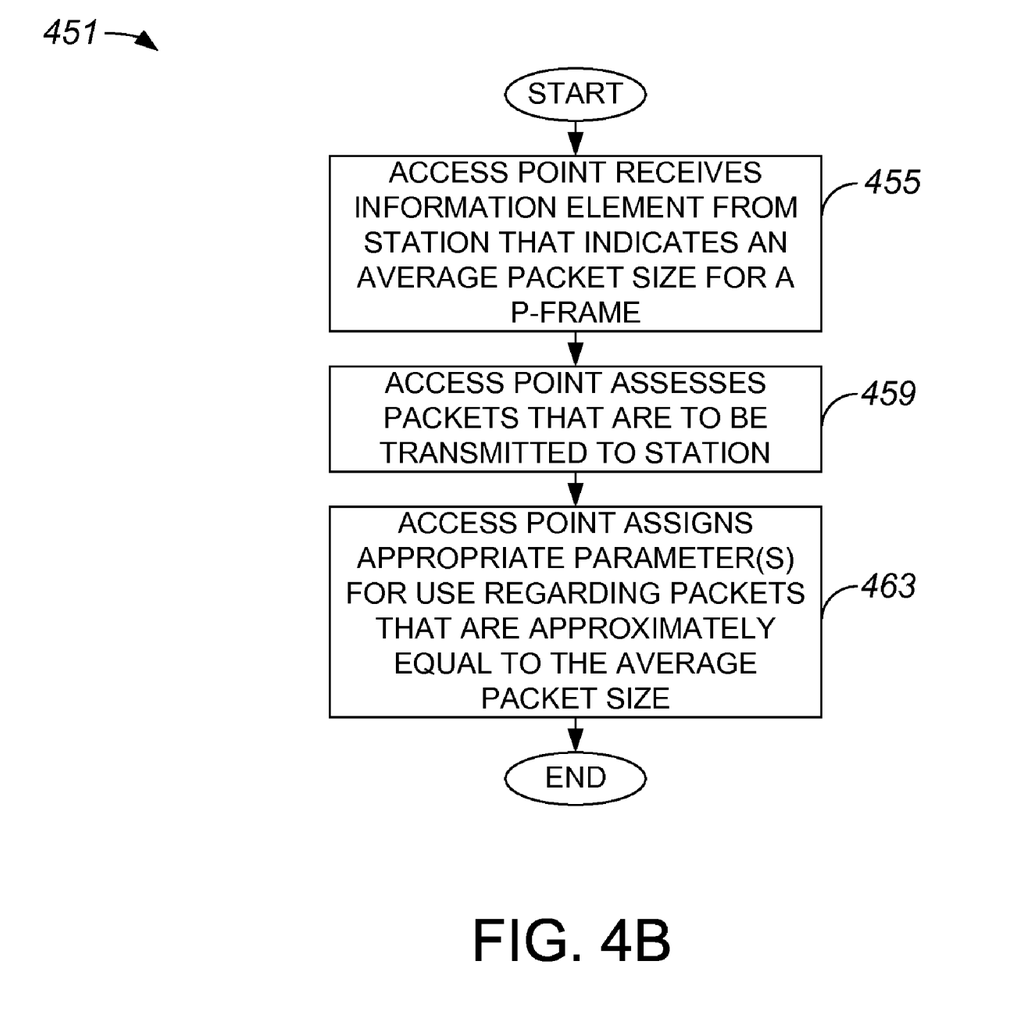
FIG. 4B is a process flow diagram which illustrates a method of an access point processing a notification regarding an average size of a packet associated with P-frames in accordance with an embodiment of the present invention.

FIG. 4B is a process flow diagram which illustrates a method of an access point processing a notification regarding an average size of a packet that contains P-frames in accordance with an embodiment of the present invention. A method 451 of processing a notification regarding an average size of a packet that contains P-frames begins at step 455 in which an access point receives an information element from a station that indicates an average packet size for a P-frame. As previously mentioned, the information element may be embodied in substantially any suitable message sent by the station, e.g., the information element may be embodied as an ethertype wemt_ether_type data packet of an iframe_pframe_avg_size_subtype subtype. Upon receiving the information element, the access point assesses packets that are to be transmitted to the station in step 459. In one embodiment, the access point may study queues of packets destined for the station, and identify substantially all packets which are approximately the average packet size as being P-frames.

After the access point assesses the packets, the access point assigns appropriate parameters to the packets identified as containing P-frames in step 463. The parameters are then used in processing the packets. By way of example, the packets that are not IP fragments and have a size that is approximately equal to the average packet size received in step 455 may be assigned a lower than normal packet aging timeout. Assigning a lower than normal value to a packet aging timeout parameter to packets containing P-frames reduces the amount of time P-frames remain in a queue before aging out. As P-frames are less critical than I-frames, allowing them to age out relatively early effectively increases the efficiency with which more critical frames such as I-frames may be transmitted. Once the access point assigns appropriate parameters, the method of processing a notification regarding an average size of a packet is completed.

In some instances, multiple I-frames may be transmitted in sequence. That is, a flurry of I-frames may be generated in a video stream as a result of a relatively fast moving sequence in a video. As will be appreciated by those skilled in the art, each I-frame in a flurry of I-frames may be critical. Hence, the quality of the flurry of I-frames is crucial, and the ability to transmit substantially all of the packets corresponding to all the I-frames in a flurry of I-frames efficiently is important. However, generating a sequence of information elements that identify each I-frame may be inefficient, and result in a significant increase in uplink traffic. As such, once a flurry of I-frames is detected, the transmission of information elements which identify each I-frame may be ceased until the flurry of I-frames has ceased.

Figure 5A:
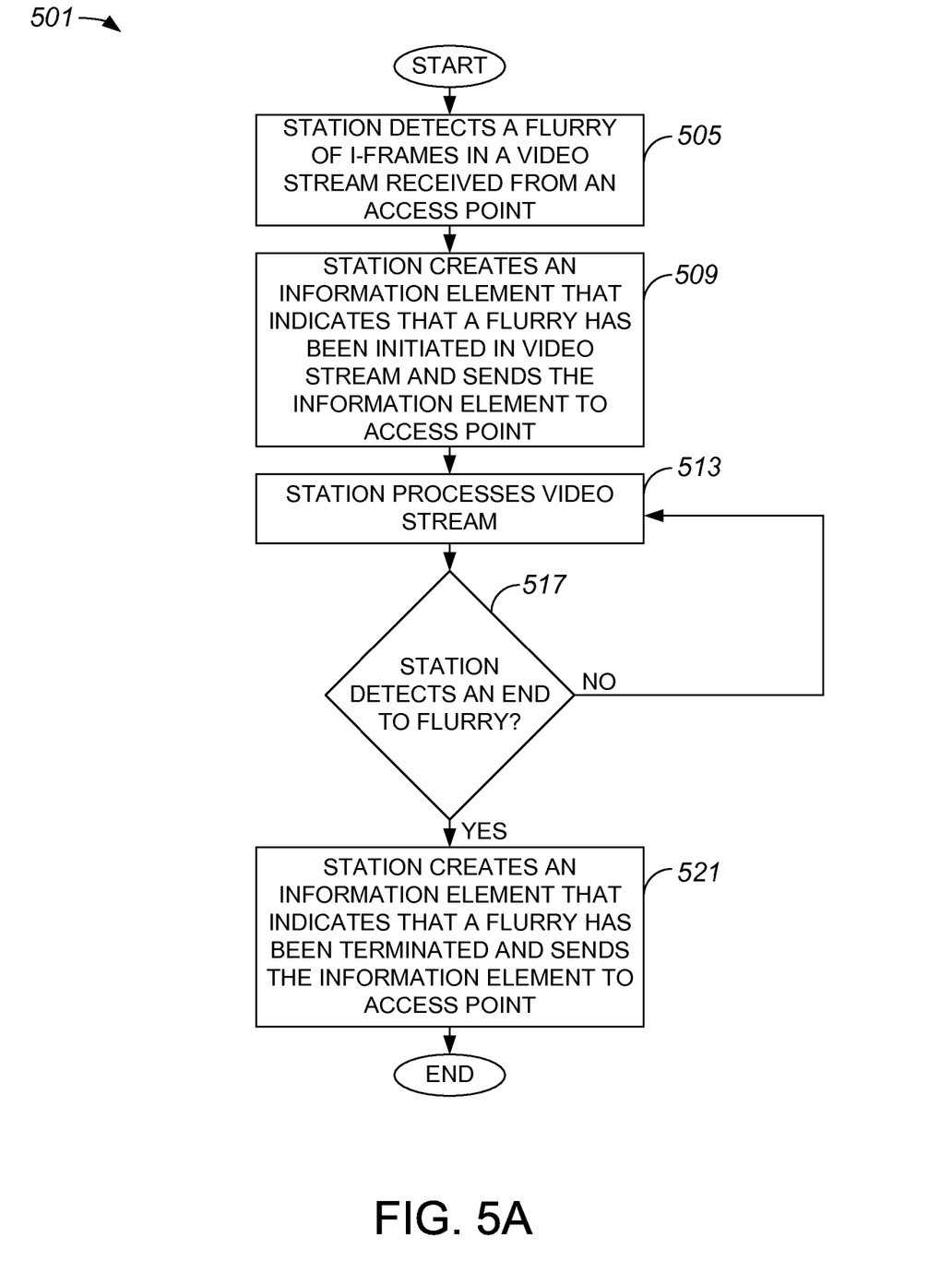
FIG. 5A is a process flow diagram which illustrates a method of processing a flurry of I-frames in accordance with an embodiment of the present invention.

FIG. 5A is a process flow diagram which illustrates a method of processing a flurry of I-frames in accordance with an embodiment of the present invention. A method 501 of processing a flurry of I-frames begins at step 505 in which a station detects a flurry of I-frames in a video stream obtained from an access point. A flurry of I-frames may be detected when a predetermined number of consecutive I-frames is detected, as for example by examining the headers of fragments. After the station detects the flurry of I-frames, the station creates an information element that indicates that a flurry has been initiated in a video stream in step 509. The station also sends the information element to the access point. Although the information element may be embodied in substantially any management message, the information element may be defined as a data packet of an ethertype wemt_ether_type type and an iframe_flurry_start subtype.

After the station transmits the information element to the access point, the station process the video stream in step 513. Processing the video stream may include, but is not limited to, identifying whether frames in the video stream are I-frames. A determination is made in step 517 regarding whether the station has detected an end to the flurry of I-frames. Such a determination may include determining if a predetermined number of consecutive received frames in the video stream are not I-frames. If the station has not detected an end to the flurry of I-frames, then process flow returns to step 513 in which the station continues to process the video stream.

Alternatively, if the station detects an end to the flurry of I-frames, the station creates an information element in step 521 that indicates that the flurry of I-frames is completed, and send the information element to the access point from which the video stream is obtained. The information element may be embodied in substantially any suitable message. In one embodiment, the suitable message may be a data packet of an ethertype wemt_ethertype_type and an iframe_flurry_stop subtype. Once the information element is sent to the access point, the method of processing a flurry of I-frames is completed.

Figure 5B:
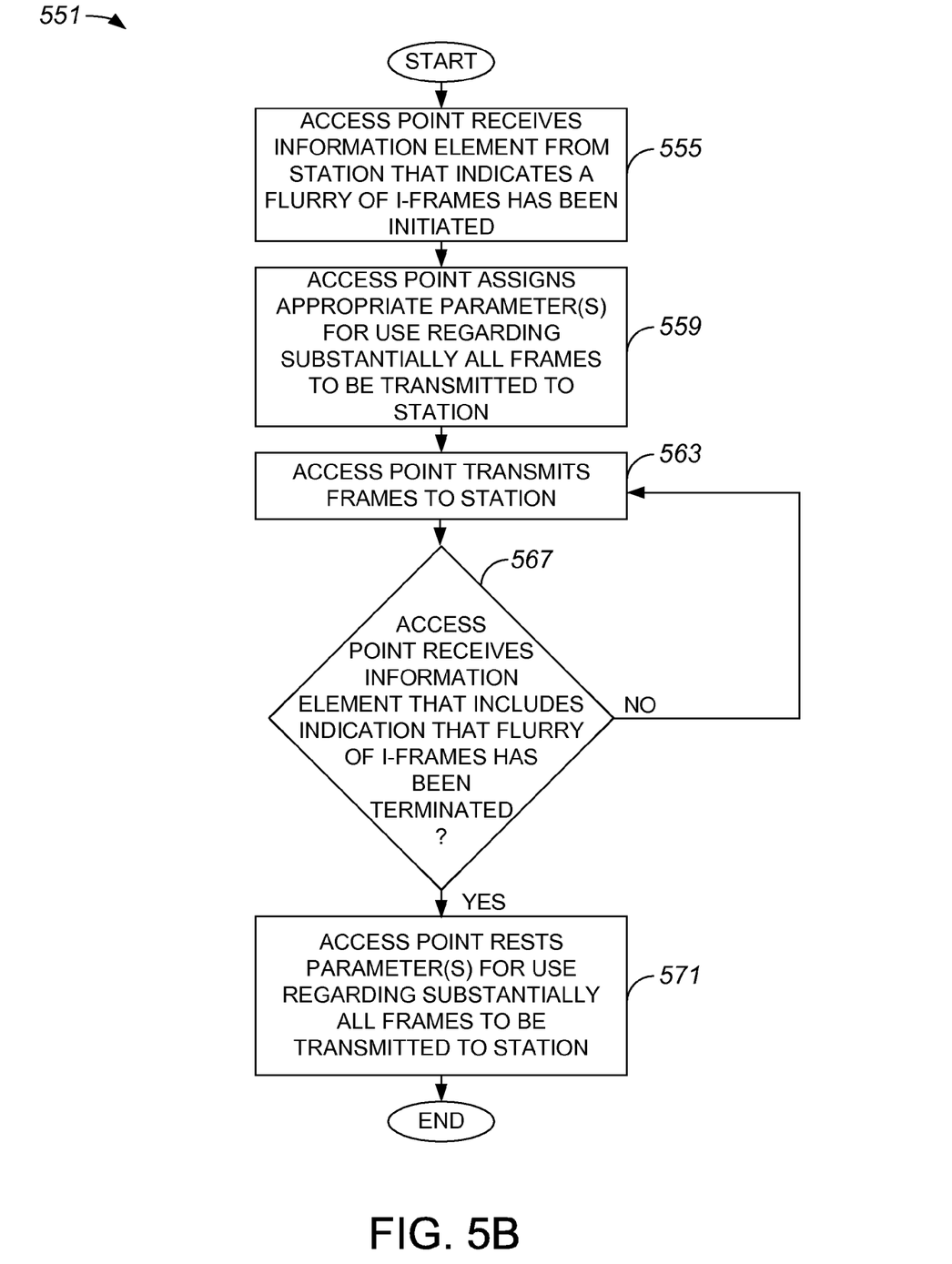
FIG. 5B is a process flow diagram which illustrates a method of an access point processing notifications regarding a flurry of I-frames that are being transmitted to a station in accordance with an embodiment of the present invention.

Referring next to FIG. 5B, a method of processing notifications regarding a flurry of I-frames that are received from a station will be described in accordance with an embodiment of the present invention. A method 551 of processing a notification regarding a flurry of I-frames begins at step 555 in which an access point receives an information element from a station that indications a flurry of I-frames has been detected by the station. Once the information element has been received, the access point assigns appropriate parameters for use regarding substantially all frames that are to be transmitted to the station in step 559. The appropriate parameters may be parameters that provide packets associated with the frames with an increased chance of transmission. A higher than normal priority, a higher than normal packet time out, a more aggressive back-offs, and/or an increased retry limit for retransmission, may provide I-frames with an increased chance of transmission.

After the access point assigns or otherwise resets the parameters, the access point transmits frames to the station in step 563 using WEMT processing based on the parameters. It is determined in step 567 if the access point has received an information element from the station that indicates that the flurry of I-frames has been terminated. That is, the access point determines if the station has detected an end to the flurry of I-frames. If it is determined in step 567 that the access point has not received an information element that includes an indication that the flurry of I-frames has been terminated, the access point continues to transmit frames to the station in step 563.

Alternatively, if it is determined that the access point has received an information element that includes an indication that the flurry of I-frames has been terminated, process flow moves to step 571 in which the access point resets parameters to a normal, or default level. The normal parameters are than used to process substantially all frames to be transmitted to the stations, e.g., until an information element received from the station indications that the parameters are to be updated. Once the access point resets the parameters, the method of processing a notification regarding a flurry of I-frames is completed.

Figure 6:
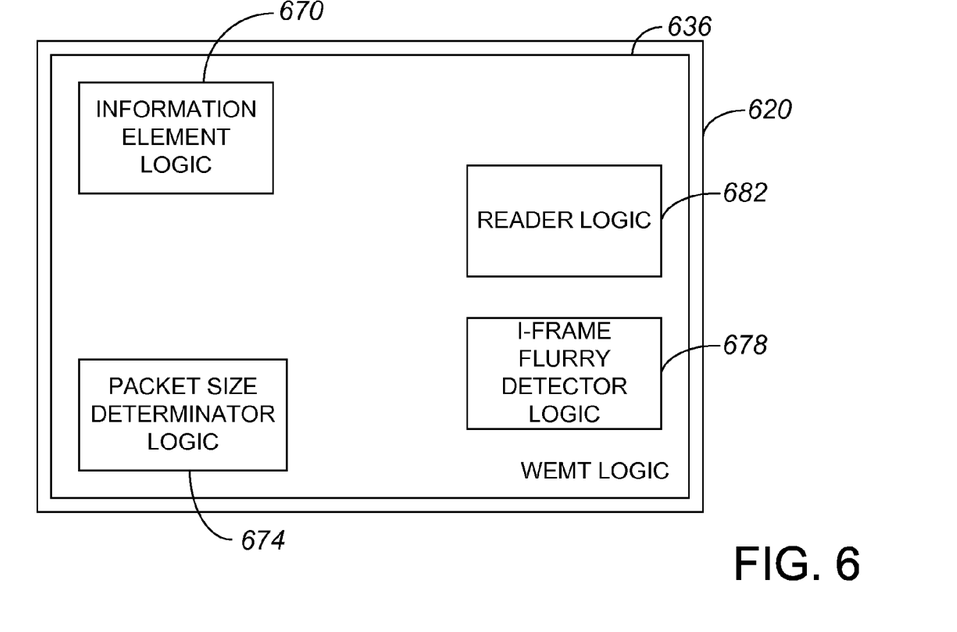
FIG. 6 is a block diagram representation of logic that is arranged to be executed on a network element such as a station which supports WEMT in accordance with an embodiment of the present invention.

With reference to FIG. 6, a network element such as a station which supports WEMT will be described in accordance with an embodiment of the present invention. A network element 620, which may be a station such as a wireless phone or a laptop computer, includes WEMT logic 636. WEMT logic 636, which may include software logic and/or hardware logic embodied in one or more tangible media, includes information element logic 670 that is arranged to create an information element to be transmitted to an access point. WEMT logic 636 also includes packet size determinator logic that is arranged to collect information and to determine the average size of a packet, e.g., a packet that contains a P-frame. I-frame flurry detector logic 678 is arranged to detect or otherwise sense a flurry of I-frames, and reader logic 682 is arranged to read the contents of a fragment or a packet to assess the contents.

Figure 7:
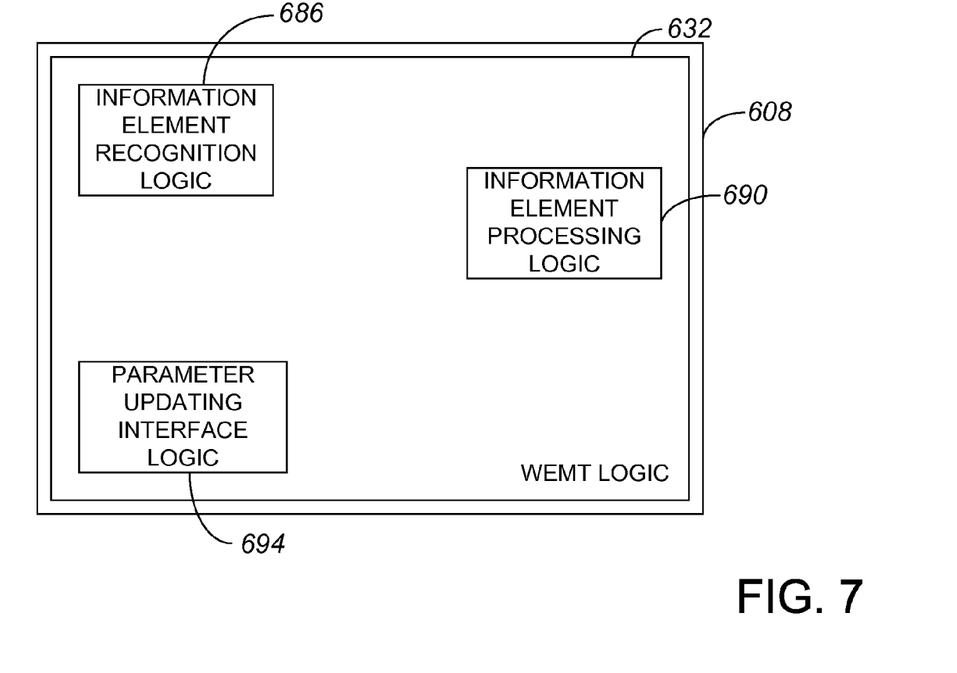
FIG. 7 is a block diagram representation of logic that is arranged to be executed on a controller such as an access point which supports WEMT in accordance with an embodiment of the present invention.

Like a station, a controller such as an access point that supports WEMT also includes WEMT logic. FIG. 7 is a block diagram representation of WEMT logic that is arranged to be executed on a controller such as an access point in accordance with an embodiment of the present invention. A controller 608 includes WEMT logic 632. WEMT logic 632 may be embodied in a tangible media, and may include either or both hardware logic and software logic. Information element recognition logic 686 is arranged to recognize when an information element has been received. In other words, information element recognition logic 686 identifies information elements that contain information associated with WEMT. Information element processing logic 690 is arranged to identify and to apply the information contained in information elements received by controller 608. Parameter updating interface logic 694 is arranged to enable parameters used in WEMT to be updated based on information obtained from information elements by information element processing logic 690.

Although only a few embodiments of the present invention have been described, it should be understood that the present invention may be embodied in many other specific forms without departing from the spirit or the scope of the present invention. By way of example, while the present invention has been described in terms of a receiver such as a station providing information to a controller such as an access point, the controller itself may analyze a video stream to identify I-frames and P-frames. That is, the identification of I-frames and P-frames in an MPEG stream for WEMT may be made either using feedback from a receiver or substantially by a controller without feedback from a receiver.

An overall system may be arranged to utilize WEMT substantially only under certain conditions. That is, the use of WEMT may not be particularly efficient under certain conditions. For instance, when there are relatively low channel load conditions, the use of WEMT may not be triggered by a station. On other hand, a station may generally initiate WEMT when channel load conditions are relatively high.

While management frames such as ADDTS requests and ADDTS responses may be used to transmit WEMT information elements between stations and access points, any suitable management frame may generally be used to transmit WEMT information elements. That is, management frames which may include WEMT information elements are not limited to being ADDTS requests and ADDTS responses. In one embodiment, management frames which are specific to systems that support WEMT may be used.

In general, a station may attempt to initiate WEMT when a channel load is relatively high, e.g., over a predetermined threshold. If the station sends an information element that requests WEMT when a communications channel or link is near congestion, an access point that supports WEMT may then effectively drop non-conforming video traffic while increasing the efficiency with which I-frames are transmitted.

The steps associated with the methods of the present invention may vary widely. Steps may be added, removed, altered, combined, and reordered without departing from the spirit of the scope of the present invention. Therefore, the present examples are to be considered as illustrative and not restrictive, and the invention is not to be limited to the details given herein, but may be modified within the scope of the appended claims.

What is claimed is:

1. A method comprising:
   characterizing a first packet of a video stream as being associated with a first frame type, wherein the video stream is arranged to be transmitted on a wireless local area network (WLAN), and wherein the video stream is a MPEG video stream and the WLAN is an 802.11 network;
   transmitting an initial packet of the video stream to a station;
   processing at least the first packet of the video stream as being associated with the first frame type if the first packet of the video stream is characterized as being of the first frame type;
   determining if a frame type associated with the first packet of a video stream is the first frame type, wherein the first packet of the video stream is characterized as being of the first type when the frame type associated with the first packet of the video stream is determined to be the first frame type; and
   processing the at least the first packet of the video stream as not being of the first frame type if it is determined that the frame type is not the first frame type; and
   receiving an indication of a frame type associated with the initial packet of the video stream, wherein if the indication of the frame type associated with the initial packet of the video stream is that the frame type associated with the initial packet of the video stream is an I-frame type, processing the at least the first packet of the video stream as being of the first frame type comprises processing the at least the first packet of the video stream as being associated with an I-frame.

2. The method of claim 1 wherein processing the at least the first packet of the video stream as being associated with the I-frame comprises performing at least one selected from the group comprising raising a processing priority, raising a transmission retry limit, raising a packet aging time out, and increasing back-off parameters.

3. The method of claim 1 wherein if the indication of the frame type associated with the initial packet of the video stream is that the frame type associated with the initial packet of the video stream is a P-frame type, processing the at least the first packet of the video stream as being of the first frame type comprises performing at least one selected from the group comprising lowering a processing priority, lowering a transmission retry limit, lowering a packet aging time out, and decreasing back-off parameters.

4. The method of claim 1 wherein characterizing the first packet of the video stream as being of the first frame type comprises:
   determining an average size associated with the first frame type; and
   determining if the first packet of the video stream comprises a second packet of approximately the same size as the average size associated with the first frame type, wherein the first packet of the video stream is processed as being of the first frame type if it is determined that the second packet is of approximately the same size as the average size associated with the first frame type.

5. The method of claim 4 wherein the average size associated with the first frame type is an average size associated with an average packet associated with the first frame type.

6. The method of claim 1 wherein characterizing the first packet of the video stream as being of a first frame type comprises identifying a transmission of a flurry of frames of the first frame type.

7. The method of claim 1 wherein characterizing the first packet of the video stream as being associated with the first frame type includes studying the first packet.

8. Logic encoded in one or more tangible media for execution and when executed operable to:

characterize a first packet of a video stream as being associated with a first frame type, wherein the video stream is arranged to be transmitted on a wireless local area network (WLAN) wherein the video stream is a MPEG video stream and the WLAN is an 802.11 network;

transmit an initial packet of the video stream to a station;

process at least the first packet of the video stream as being associated with the first frame type if the first packet of the video stream is characterized as being of the first frame type;

determine if a frame type associated with the first packet of a video stream is the first frame type, wherein the first packet of the video stream is characterized as being of the first type when the frame type associated with the first packet of the video stream is determined to be the first frame type;

process the at least the first packet of the video stream as not being of the first frame type if it is determined that the frame type is not the first frame type; and receive an indication of a frame type associated with the initial packet of the video stream, wherein if the indication of the frame type associated with the initial packet of the video stream is that the frame type associated with the initial packet of the video stream is an I-frame type, the logic operable to process the at least the first packet of the video stream as being of the first frame type comprises logic operable to process the at least the first packet of the video stream as being associated with an I-frame.

9. The logic of claim 8 wherein the logic operable to process the at least the first packet of the video stream as being associated with the I-frame comprises logic operable to perform at least one selected from the group comprising raising a processing priority, raising a transmission retry limit, raising a packet aging time out, and increasing back-off parameters.

10. The logic of claim 8 wherein if the indication of the frame type associated with the initial packet of the video stream is that the frame type associated with the initial packet of the video stream is a P-frame type, the logic operable to process the at least the first packet of the video stream as being of the first frame type comprises logic operable to perform at least one selected from the group comprising lowering a processing priority, lowering a transmission retry limit, lowering a packet aging time out, and decreasing back-off parameters.

11. The logic of claim 8 wherein the logic operable to characterize the first packet of the video stream as being of the first frame type is further operable to:

determine an average size associated with the first frame type; and determine if the first packet of the video stream comprises a second packet of approximately the same size as the average size associated with the first frame type, wherein the first packet of the video stream is processed as being of the first frame type if it is determined that the second packet is of approximately the same size as the average size associated with the first frame type.

12. The logic of claim 11 wherein the average size associated with the first frame type is an average size associated with an average packet associated with the first frame type.

13. The logic of claim 8 wherein the logic operable to characterize the first packet of the video stream as being of a first frame type comprises logic operable to identify a transmission of a flurry of frames of the first frame type.

14. The logic of claim 8 wherein the logic operable to characterize the first packet of the video stream as being associated with the first frame type is further operable to study the first packet to identify the first packet as being associated with the first frame type.

* * * * *